(12) United States Patent
Shigiya

(10) Patent No.: US 12,492,998 B2
(45) Date of Patent: Dec. 9, 2025

(54) SMART CAMERA AND IMAGE INSPECTION SYSTEM

(71) Applicant: Keyence Corporation, Osaka (JP)

(72) Inventor: Atsuhito Shigiya, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 170 days.

(21) Appl. No.: 18/589,503

(22) Filed: Feb. 28, 2024

(65) Prior Publication Data

US 2024/0328958 A1 Oct. 3, 2024

(30) Foreign Application Priority Data

Mar. 31, 2023 (JP) ................................. 2023-058199

(51) Int. Cl.
*G01N 21/88* (2006.01)

(52) U.S. Cl.
CPC ..... *G01N 21/8806* (2013.01); *G01N 21/8851* (2013.01); *G01N 2021/8835* (2013.01)

(58) Field of Classification Search
CPC ........... G01N 21/8806; G01N 21/8851; G01N 2021/8835; H04N 23/56
USPC .......................................................... 348/92
See application file for complete search history.

(56) References Cited

U.S. PATENT DOCUMENTS

| | | | |
|---|---|---|---|
| 12,241,838 B2* | 3/2025 | Kondo | H04N 23/60 |
| 12,416,483 B2* | 9/2025 | O'Hare | G01B 21/047 |
| 2003/0193571 A1* | 10/2003 | Schultz | H04N 23/617 |
| | | | 348/207.99 |
| 2009/0027509 A1* | 1/2009 | Giesen | H04N 23/90 |
| | | | 348/211.3 |
| 2010/0118136 A1* | 5/2010 | Riet | G01B 11/306 |
| | | | 382/152 |
| 2015/0355103 A1* | 12/2015 | Ando | G06T 7/586 |
| | | | 348/46 |
| 2019/0279355 A1* | 9/2019 | Waldl | H04N 23/56 |
| 2019/0304082 A1* | 10/2019 | Tokashiki | H04L 63/101 |
| 2022/0084182 A1* | 3/2022 | Ohya | G06N 20/00 |

(Continued)

FOREIGN PATENT DOCUMENTS

JP 2013158889 A 8/2013

OTHER PUBLICATIONS

U.S. Appl. No. 18/589,500, filed Feb. 28, 2024 (45 pages).

*Primary Examiner* — Helen Shibru
(74) *Attorney, Agent, or Firm* — Kilyk & Bowersox, P.L.L.C.

(57) ABSTRACT

In a use mode in which a smart camera having an illumination control function is connected to an image processing controller, illumination control of the smart camera and illumination control of the image processing controller do not compete with each other. In a master mode, a smart camera turns on an external illuminator by an illumination control function of the smart camera, images light reflected by a workpiece, among beams of light of the external illuminator, by an imaging unit to generate a workpiece image, and executes an inspection process on the workpiece image. In a slave mode, the smart camera images light reflected by a workpiece, among beams of light of an illuminator turned on under control of an image processing controller, by the imaging unit to generate a workpiece image, and transfers the workpiece image to the image processing controller.

8 Claims, 11 Drawing Sheets

(56) References Cited

U.S. PATENT DOCUMENTS

| | | | |
|---|---|---|---|
| 2022/0335587 A1* | 10/2022 | Hama | H04N 23/72 |
| 2023/0304940 A1* | 9/2023 | Isken | H04N 23/51 |
| 2023/0421891 A1 | 12/2023 | Shigiya | |
| 2024/0314420 A1* | 9/2024 | Hirakawa | H04N 23/90 |
| 2025/0004629 A1* | 1/2025 | Uchiyama | G06F 3/0486 |
| 2025/0076205 A1* | 3/2025 | Jinno | G01N 21/8806 |

* cited by examiner

ILLUMINATOR REGISTRATION

1. ILLUMINATOR REGISTRATION >> 2. ILLUMINATOR ID SETTING — 113

PLEASE ASSIGN ILLUMINATOR ID TO REGISTERED ILLUMINATOR.

| No. | LED MODEL | STATUS | CH | NAME OF ILLUMINATOR | ILLUMINATOR ID |
|---|---|---|---|---|---|
| 1 | AAA | ● | 1ch | AAA | LIGHT 01 ⌄ |
| 2 | AAA | ● | 2ch | AAA | LIGHT 02 ⌄ |

114a

114

CANCEL   ▼RETURN   NEXT▲   FINISH

SMART CAMERA AND IMAGE INSPECTION SYSTEM

CROSS-REFERENCE TO RELATED APPLICATIONS

The present application claims foreign priority based on Japanese Patent Application No. 2023-058199, filed Mar. 31, 2023, the contents of which are incorporated herein by reference.

BACKGROUND OF THE INVENTION

Field of the Invention

The present disclosure relates to a smart camera having an illumination control function and an image inspection system.

Description of Related Art

As an image inspection system, a controller-type system that includes a camera which images a workpiece and an image processing controller which controls the connected camera, and that inspects an image captured by the camera by the image processing controller has been known in the related art.

In addition to this controller type, there is also a case where smart cameras that can independently execute functions from imaging to image inspection have recently been used in the field of image inspection (for example, see JP2013-158889A).

SUMMARY OF THE INVENTION

In a case where the smart camera as in JP2013-158889A is used, when an illuminator is connected to the smart camera, the illuminator can be controlled by the smart camera.

However, when compared with the image processing controller, the smart camera has less processing resources. Therefore, the processing resources may be insufficient depending on types of the inspection or the like.

It is considered that an image processing controller is further connected to the smart camera and operated in order to compensate for insufficiency of the processing resources of the smart camera. Accordingly, it is possible to perform an inspection by combining the processing resources of the smart camera and processing resources of the image processing controller. Therefore, it is possible to perform an inspection that exceeds a processing capacity of a single smart camera or a single image processing controller, or to improve an inspection speed by sharing a process by the smart camera and the image processing controller.

However, since it is not assumed that the related-art smart camera is connected to the image processing controller, there is a problem that illumination control when capturing a workpiece image may lead to a competition in a use mode in which the smart camera is connected to the image processing controller.

The present disclosure has been made in view of this point, and an object thereof is to prevent a competition between illumination control of a smart camera having an illumination control function and illumination control of an image processing controller in a use mode in which the smart camera is connected to the image processing controller.

In order to achieve the above object, in one aspect of the present disclosure, a smart camera having an illumination control function can be assumed. The smart camera includes: an imaging unit configured to image a workpiece to generate a workpiece image; an inspection unit configured to execute an inspection process on the workpiece image; an interface unit connectable to an external illuminator and an image processing controller configured to execute the inspection process on the workpiece image; and a mode switching unit configured to switch a mode to any one of a master mode in which the illumination control function is executable and a slave mode in which the illumination control function is not executable. In the master mode, the smart camera turns on an external illuminator connected via the interface unit by the illumination control function, images light reflected by a workpiece, among beams of light of the external illuminator, by the imaging unit to generate a workpiece image, and executes an inspection process on the workpiece image by the inspection unit. In the slave mode, the smart camera images light reflected by a workpiece, among beams of light of an illuminator turned on under control of the image processing controller connected via the interface unit, by the imaging unit to generate a workpiece image, and transfers the workpiece image to the image processing controller.

According to the configuration, in a case where the external illuminator is connected to the smart camera via the interface unit, when the mode is switched to the master mode, the smart camera controls the external illuminator by the illumination control function of the smart camera, and causes light to be emitted on the workpiece. The inspection process on the workpiece image generated in the master mode is executed by the inspection unit of the smart camera.

On the other hand, in a case where the image processing controller is connected to the smart camera via the interface unit, when the mode is switched to the slave mode, the image processing controller controls the illuminator to emit light to the workpiece. Accordingly, it is possible to prevent the illumination control of the smart camera having the illumination control function and the illumination control of the image processing controller from competing with each other in a use mode in which the smart camera is connected to the image processing controller. The workpiece image generated in the slave mode is transferred to the image processing controller, and the inspection process is executed by the image processing controller.

The mode switching unit may be configured to receive a mode switching signal from the image processing controller via the interface unit. In this case, when receiving the mode switching signal, the mode switching unit can switch the mode from the master mode to the slave mode based on the mode switching signal.

In another aspect of the present disclosure, an image inspection system including a smart camera having an illumination control function, an illumination controller connected to the smart camera via a network and having an IP address, a plurality of external illuminators connected to the smart camera via the illumination controller, and an inspection setting apparatus connected to the smart camera and configured to create an inspection setting including an imaging tool and an inspection tool can be assumed. The inspection setting apparatus can create the inspection setting by displaying a list of the plurality of external illuminators on the network, and receiving from a user a selection of an external illuminator to be used when executing the imaging tool from the list. The smart camera can instruct the illumination controller to turn on the selected external illuminator when executing the imaging tool created by the inspection setting apparatus. That is, when the smart camera is connected to the illumination controller via the network, a degree of freedom of installation such as wiring can be increased, and since the illumination controller has an IP address, the list of external illuminators on the network can be confirmed, and the inspection setting including an illuminator to be used can be created.

The smart camera and the image processing controller may be configured to store an inspection setting created by the inspection setting apparatus. In this case, since the smart camera and the image processing controller can only refer to the inspection setting stored in the image processing controller without referring to the inspection setting stored in the smart camera, there is no competition between the inspection setting stored in the smart camera and the inspection setting stored in the image processing controller.

The inspection setting apparatus may be configured to give illuminator IDs to the plurality of external illuminators on the network. In this case, it is possible to create the inspection setting in which the external illuminator to be used when executing the imaging tool is specified by the illuminator ID, and to output the inspection setting. That is, an illuminator can be set for each camera without making a user aware of an IP address of the illumination controller. Since the illumination setting can be managed in a unit of an illuminator ID, when new apparatuses having the same camera and illuminator configuration are added, an inspection setting including an illumination setting can be used as it is on a new apparatus side by associating an IP address of an illumination controller on the new apparatus side with a corresponding illuminator ID.

The inspection setting apparatus can create the inspection setting by further receiving from a user a selection of a first external illuminator to be used when executing an imaging tool corresponding to the first camera from the list of the plurality of external illuminators. In this case, the image processing controller can instruct the illumination controller to turn on the first external illuminator when executing the imaging tool corresponding to the first camera. Therefore, for example, when a plurality of cameras are required, since an inspection setting in which an illuminator to be paired for each camera is specified can be created, convenience is improved.

As described above, an external illuminator can be turned on by the illumination control function of the smart camera in the master mode, and an illuminator can be turned on under control of the image processing controller in the slave mode. Therefore, it is possible to prevent competition between the illumination control of the smart camera and the illumination control of the image processing controller in the use mode in which the smart camera having the illumination control function is connected to the image processing controller.

BRIEF DESCRIPTION OF THE DRAWINGS

FIG. 9 is an example of an illuminator ID setting screen.

DETAILED DESCRIPTION

Hereinafter, an embodiment of the present invention will be described in detail with reference to the drawings. The following description of a preferred embodiment is essentially nothing more than an illustration, and is not to limit the present invention, an application thereof, or a usage thereof.

Figure 1:
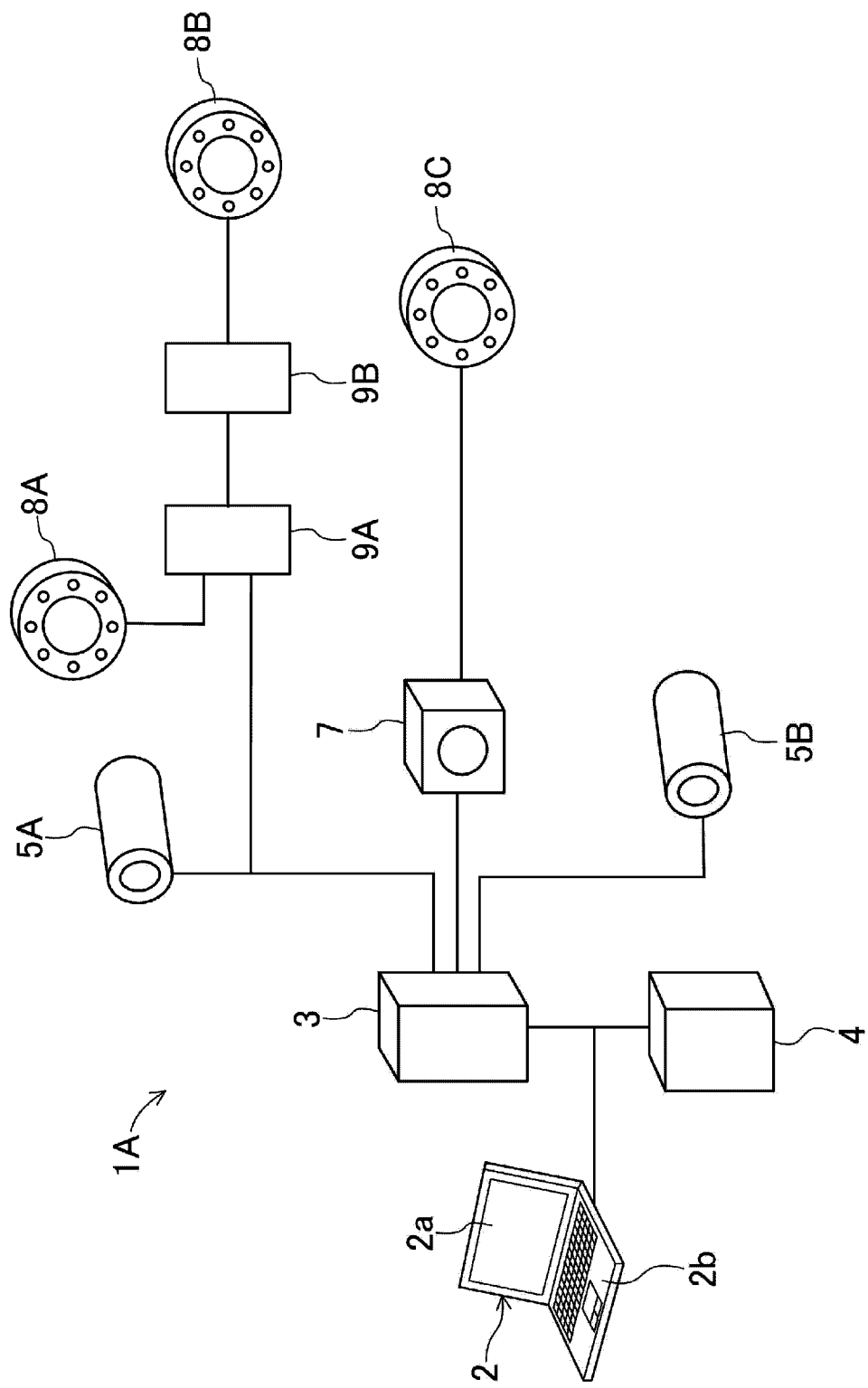
FIG. 1 is a diagram showing a schematic configuration of a first image inspection system according to an embodiment of the present invention.

FIG. 1 is a diagram showing a schematic configuration of a first image inspection system 1A according to an embodiment of the present invention. The first image inspection system 1A includes an inspection setting apparatus 2 for creating inspection settings including an imaging tool and an inspection tool, an image processing controller 3, a programmable logic controller (PLC) 4, normal cameras 5A and 5B that generate workpiece images, a smart camera 7 that generates a workpiece image, external illuminators 8A, 8B, and 8C, and illumination controllers 9A and 9B. The inspection setting apparatus 2 is implemented by, for example, a personal computer or the like, and includes a display unit 2a and an operation unit 2b. The display unit 2a is implemented by, for example, a liquid crystal display device or an organic EL display device, and is a member for displaying a workpiece image, an inspection result, various setting screens, and the like. The operation unit 2b is a member for operating the first image inspection system 1A, and a user can perform various setting operations and the like via the operation unit 2b. The operation unit 2b includes, for example, a keyboard, a mouse, and a touch panel. The touch panel is configured to detect a touch operation by the user. The touch panel and the display unit 2a may be integrated with each other. In this case, for example, a setting image displayed on the display unit 2a can be directly operated on the touch panel.

The image processing controller 3 can execute control of the external illuminators 8A, 8B, and 8C, and an inspection process of workpiece images generated by the normal cameras 5A and 5B and the smart camera 7. An inspection result obtained by the image processing controller 3 is output to the inspection setting apparatus 2 and displayed on the display unit 2a. A trigger signal for starting an inspection is input from the PLC 4 to the image processing controller 3.

The normal cameras 5A and 5B have an image generation function. The smart camera 7 has an image inspection function and an illumination control function in addition to the image generation function. The image generation function is a function of imaging a workpiece to generate a workpiece image. Further, the image inspection function is a function capable of executing one or more types of inspection processes on the workpiece image, and is not mounted on the normal cameras 5A and 5B. Further, the illumination control function is a function of controlling the external illuminator 8C, and is not mounted on the normal cameras 5A and 5B. That is, the normal camera means a camera on which the image inspection function and the illumination control are not mounted.

The first image inspection system 1A is a system that inspects a workpiece imaged by the normal cameras 5A and 5B or the smart camera 7. The normal cameras 5A and 5B and the smart camera 7 are installed on, for example, a line where a plurality of workpieces are conveyed sequentially, and can image the conveyed workpieces sequentially.

Since the image inspection function is not mounted on the normal cameras 5A and 5B, the workpiece images generated by the normal cameras 5A and 5B are inspected by the image inspection function of the image processing controller 3. On the other hand, since the image inspection function is mounted on the smart camera 7, an inspection target image generated by the smart camera 7 can be inspected by the smart camera 7. As will be described later, the entire or a part of the inspection of the inspection target image generated by the smart camera 7 may be executed by the image inspection function of the image processing controller 3.

FIG. 1 shows an operation mode where two normal cameras 5A and 5B and one smart camera 7 are simultaneously connected to the image processing controller 3, but the number of cameras to be connected is not limited thereto. An operation mode where one or more normal cameras and one or more smart cameras are simultaneously connected to the image processing controller 3 can also be adopted.

An operation mode where one or more normal cameras are connected to the image processing controller 3 and the smart camera is not connected to the image processing controller 3, or an operation mode where one or more smart cameras are connected to the image processing controller 3 and the normal cameras are not connected to the image processing controller 3 can also be adopted. Further, the number of external illuminators 8A, 8B, and 8C is not limited to three, and the first image inspection system 1A can be implemented by any number of external illuminators. Similarly, the number of illumination controllers 9A and 9B can be set to any number.

Figure 2:
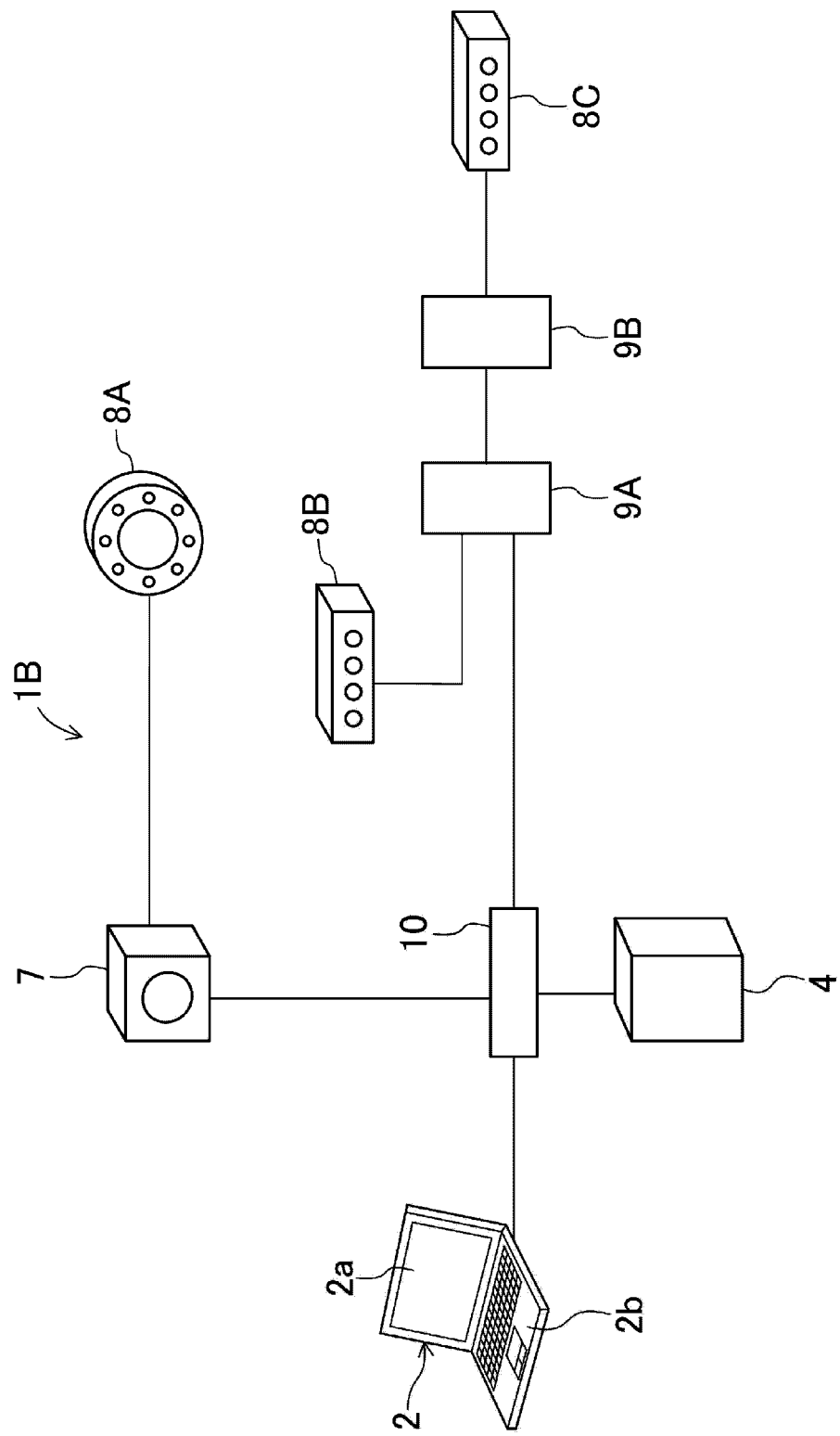
FIG. 2 is a diagram showing a schematic configuration of a second image inspection system.

As shown in FIG. 2, since the smart camera 7 can independently inspect a workpiece image, the smart camera 7 can be used without being connected to the image processing controller 3 in FIG. 1. For example, when there is one line where a workpiece is conveyed and only one portion of the workpiece may be inspected, one smart camera 7 can be introduced to a site and operated without introducing the image processing controller 3.

A second image inspection system 1B shown in FIG. 2 includes the inspection setting apparatus 2, the PLC 4, the smart camera 7, the external illuminators 8A, 8B, and 8C, the illumination controllers 9A and 9B, and a hub (Ethernet hub) 10. The inspection setting apparatus 2, the PLC 4, the smart camera 7, and the illumination controllers 9A and 9B are connected to one another via the hub 10. The illumination controllers 9A and 9B have IP addresses, and are in a state of being connected to the smart camera 7 via a network. The external illuminators 8B and 8C are connected to the smart camera 7 via the illumination controllers 9A and 9B. Further, the inspection setting apparatus 2 is also connected to the smart camera 7 via the network.

Similar to the first image inspection system 1A, in the second image inspection system 1B, the number of smart cameras, external illuminators, and illumination controllers can also be set freely.

Figure 3:
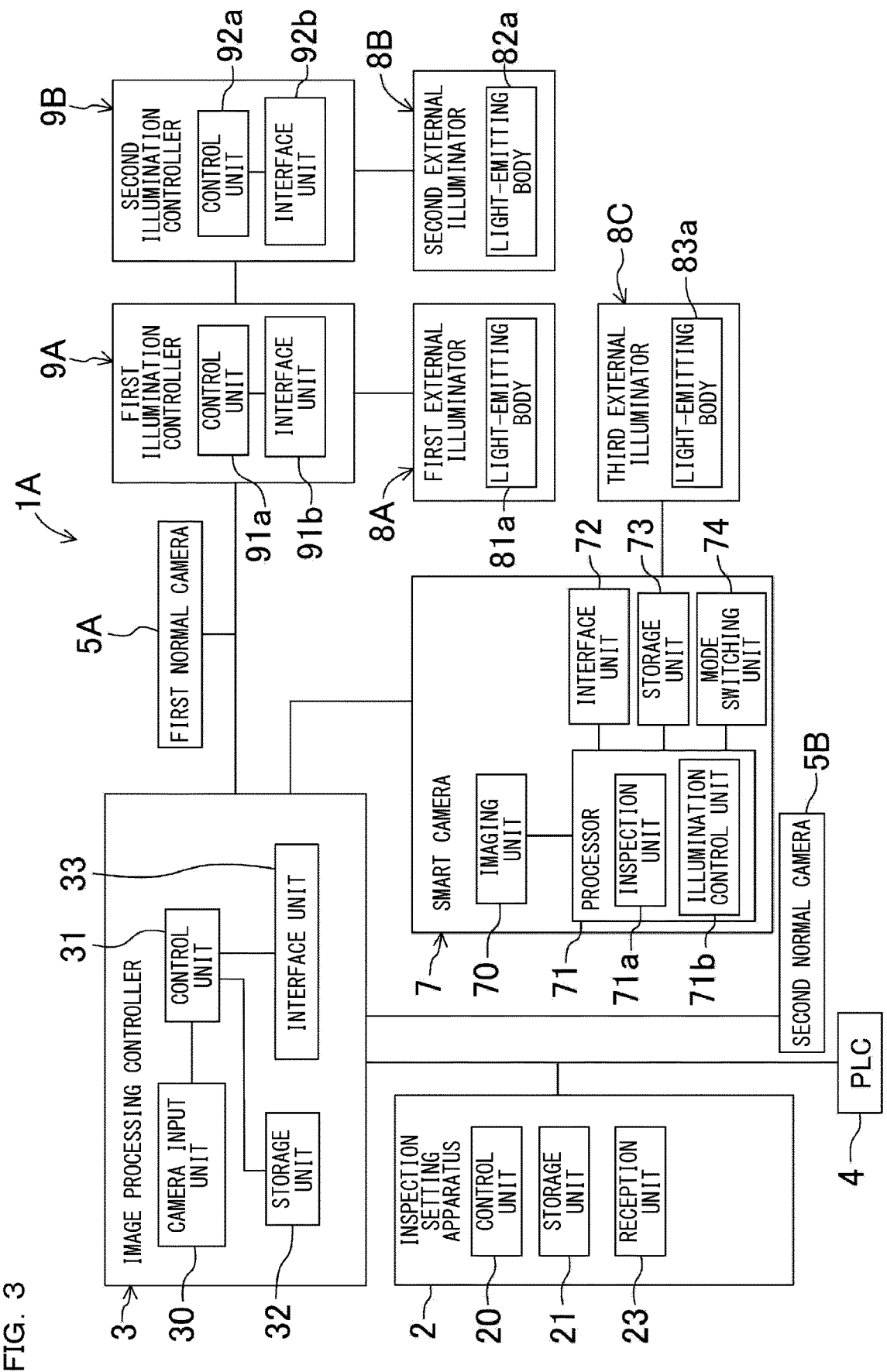
FIG. 3 is a block diagram of the first image inspection system.

FIG. 3 is a block diagram of the first image inspection system 1A. The first image inspection system 1A includes the first normal camera 5A and the second normal camera 5B. The first normal camera 5A and the second normal camera 5B are connected to the image processing controller 3. Since the first normal camera 5A is a camera having a general image generation function, detailed description thereof is omitted, and includes, for example, an optical system by which light emitted from the external illuminator 8A is reflected and is incident on a surface of a workpiece and an image sensor that receives the light emitted from the optical system. An imaging control signal is input from the image processing controller 3 to the first normal camera 5A. The second normal camera 5B is similarly implemented.

The first image inspection system 1A includes the first external illuminator 8A, the second external illuminator 8B, and the third external illuminator 8C. The first external illuminator 8A includes a light-emitting body 81a made of, for example, a light-emitting diode. The second external illuminator 8B and the third external illuminator 8C include light-emitting bodies 82a and 83a, respectively. The first external illuminator 8A is installed so as to emit light to a visual field range of the first normal camera 5A. The second external illuminator 8B is installed so as to emit light to a visual field range of the second normal camera 5B. The third external illuminator 8C is installed so as to emit light to a visual field range of the smart camera 7. It is also possible to install a plurality of external illuminators such that the external illuminators emit light to a visual field range of one camera.

The first image inspection system 1A includes the first illumination controller 9A and the second illumination controller 9B. The first external illuminator 8A is connected to the first illumination controller 9A. The first illumination controller 9A is a device that controls the first external illuminator 8A, is connected to the image processing controller 3, and operates according to a control signal from the image processing controller 3.

The second external illuminator 8B is connected to the second illumination controller 9B. The second illumination controller 9B is a device that controls the second external illuminator 8B, is connected to the image processing controller 3 via the first illumination controller 9A, and operates according to a control signal from the image processing controller 3.

Since the first illumination controller 9A and the second illumination controller 9B are the same, details of the first illumination controller 9A will be described. The first illumination controller 9A includes a control unit 91a and an interface unit 91b. The control unit 91a is implemented by combining a microcomputer, a storage device, and the like, and is a portion that controls the connected external illuminator.

Figure 4:
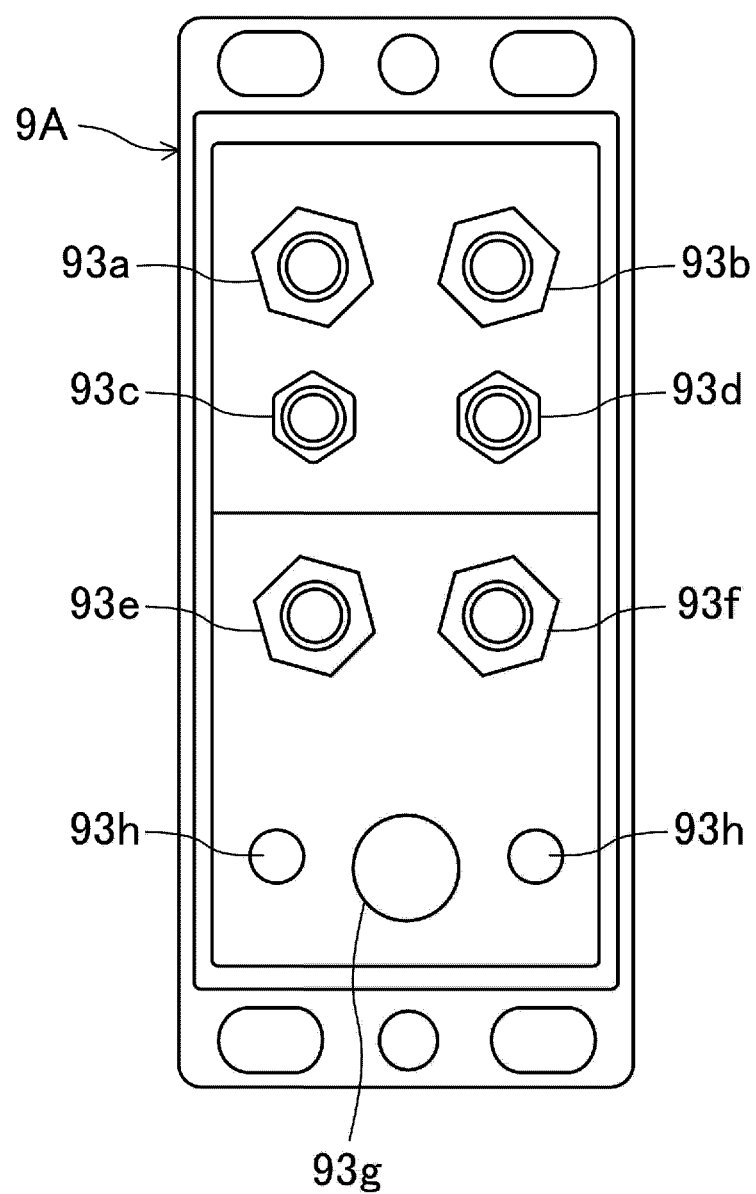
FIG. 4 is a front view of an illumination controller.

FIG. 4 is a front view of the first illumination controller 9A. The interface unit 91b of the first illumination controller 9A includes a power supply connector 93a, an external signal input connector 93b, a first Ethernet port 93c, a second Ethernet port 93d, a first illumination output port (1ch) 93e, a second illumination output port (2 ch) 93f, a dimming volume 93g, an operation switch 93h, and the like. A power supply cord (not shown) that extends from an external power supply is connected to the power supply connector 93a. A signal line (not shown) that extends from an external device is connected to the external signal input connector 93b. A signal line (not shown) that extends from the image processing controller 3 is connected to the first Ethernet port 93c and the second Ethernet port 93d. The external illuminators can be connected to the first illumination output port 93e and the second illumination output port 93f, respectively. Therefore, the plurality of external illuminators can be controlled by one first illumination controller 9A.

The dimming volume 93g adjusts brightness of the external illuminators connected to the first illumination output port 93e and the second illumination output port 93f. The operation switch 93h is used to operate the first illumination controller 9A. An operation performed by a user on the dimming volume 93g and the operation switch 93h is received by the control unit 91a, and the operation is reflected.

When a control signal is input from the image processing controller 3 to the interface unit 91b, the control unit 91a outputs a light emission signal to a connected external illuminator to cause the external illuminator to emit light. Similar to the first illumination controller 9A, the second illumination controller 9B also includes a control unit 92a and an interface unit 92b, and outputs a light emission signal to a connected external illuminator to cause the external illuminator to emit light according to a control signal input from the image processing controller 3 to the interface unit 92b.

As shown in FIG. 3, the first image inspection system 1A includes the smart camera 7. The smart camera 7 includes an imaging unit 70, a processor 71, an interface unit 72, a storage unit 73, and a mode switching unit 74. The imaging unit 70 is a portion that images a workpiece to generate a workpiece image, for example, similar to the normal camera, includes, for example, an optical system by which light emitted from the third external illuminator 8C is reflected and is incident on a surface of a workpiece and an image sensor that receives the light emitted from the optical system. An imaging control signal is input from the image processing controller 3 to the smart camera 7.

The processor 71 is implemented by, for example, a processor such as a CPU or an ASIC, and hardware such as a RAM or a ROM, and can execute various processes when the hardware executes a predetermined program. When the processor 71 executes a predetermined program, an inspection unit 71a and an illumination control unit 71b are implemented. The inspection unit 71a is a portion that executes an inspection process on a workpiece image generated by the imaging unit 70. The inspection includes, for example, determining whether there is a flaw, determining whether a measured dimension is within a tolerance range, and determining whether a workpiece is a non-defective product or a defective product.

The interface unit 72 of the smart camera 7 can be connected to the external illuminator and the image processing controller 3. In the present example, the third external illuminator 8C is connected to the interface unit 72 of the smart camera 7, but other external illuminators can also be connected. The third external illuminator 8C connected to the interface unit 72 is controlled by the illumination control unit 71b of the smart camera 7. Specifically, since start of light emission, a light emission time, a light amount, and the like of the light-emitting body 83a provided in the third external illuminator 8C are controlled by the illumination control unit 71b of the smart camera 7, the third external illuminator 8C not connected to the illumination controllers 9A and 9B can be caused to emit light under desired light emission conditions. An electric power supply to the third external illuminator 8C may be an electric power supply based on a switching power supply, and for example, an electric power supply method based on power over Ethernet (PoE) using a Local Area Network (LAN) cable may be used.

The storage unit 73 of the smart camera 7 is implemented by, for example, a semi-conductor memory, and is a portion where the program executed by the processor 71, the workpiece image generated by the imaging unit 70, various pieces of setting information, inspection results, and the like are stored.

The mode switching unit 74 is a portion that switches a mode of the smart camera 7 to any one of a master mode in which the illumination control function of the illumination control unit 71b can be executed and a slave mode in which the illumination control function of the illumination control unit 71b cannot be executed. The mode switching unit 74 is connected to the image processing controller 3 via the interface unit 72, and can receive a mode switching signal from the image processing controller 3. When receiving the mode switching signal, the mode switching unit 74 switches a current mode from the master mode to the slave mode when the current mode is the master mode, and switches a current mode from the slave mode to the master mode when the current mode is the slave mode based on the mode switching signal.

FIG. 3 shows a case where the smart camera 7 is switched to the slave mode and operates in the slave mode. In a case of the slave mode, the illumination control unit 71b of the smart camera 7 is turned off, and the third external illuminator 8C is controlled by the image processing controller 3. In this case, an illumination control signal output from the image processing controller 3 is input to the third external illuminator 8C via the smart camera 7. The term "turned off" means that the illumination control unit 71b is in a non-operation state.

When the smart camera 7 operates in the slave mode, various pieces of setting information related to illumination are stored in an image processing controller 3 side, and the various pieces of setting information related to the illumination are not stored in the smart camera 7 side. Accordingly, even when the illumination control function of the smart camera 7 is turned off, the third external illuminator 8C can be controlled. For example, when the smart camera 7 operated in the master mode is connected to the image processing controller 3, the image processing controller 3 refers to various settings stored in the image processing controller 3 itself without referring to various settings in the smart camera 7. That is, the smart camera 7 can store, in the storage unit 73 or the like, inspection settings including an imaging tool T1 and an inspection tool T2 (see FIG. 6 to be described later) created by the inspection setting apparatus 2, and the image processing controller 3 can store, in the storage unit 32 or the like, inspection settings including the imaging tool T1 and the inspection tool T2 created by the inspection setting apparatus 2. However, when the smart camera 7 is in the slave mode, the image processing controller 3 can only refer to the inspection settings stored in the image processing controller 3 without referring to the inspection settings stored in the smart camera 7.

FIG. 2 shows a case where the smart camera 7 is operated in the master mode. In the master mode, the illumination control function of the smart camera 7 is turned on, and various pieces of setting information related to illumination are stored in the smart camera 7 side. Then, the illumination control unit 71b of the smart camera 7 controls the first external illuminator 8A. Further, the illumination control unit 71b of the smart camera 7 also controls the second external illuminator 8B and the third external illuminator 8C connected to the smart camera 7 via the hub 10.

That is, in the master mode, the smart camera 7 turns on the first external illuminator 8A connected via the interface unit 72 by the illumination control function of the smart camera 7, images light reflected by a workpiece, among beams of light emitted from the first external illuminator 8A, by the imaging unit 70 to generate a workpiece image, and executes the inspection process on the generated workpiece image by the inspection unit 71a of the smart camera 7. On the other hand, in the slave mode, the smart camera 7 images light reflected by a workpiece, among beams of light of the illuminator turned on under control of the image processing controller 3, by the imaging unit 70 to generate a workpiece image. The workpiece image generated by the imaging unit 70 is transferred to the image processing controller 3 via the interface unit 72.

As shown in FIG. 3, the image processing controller 3 includes a camera input unit 30, a control unit 31, a storage unit 32, and an interface unit 33. Although not illustrated, the camera input unit 30 may be omitted, and a function of the camera input unit 30 may be provided by the interface unit 33. The camera input unit 30 is a portion to which workpiece images generated by the normal cameras 5A and 5B and the smart camera 7 are input. The workpiece image input to the camera input unit 30 is acquired by the control unit 31. Similar to the inspection unit 71a of the smart camera 7, the control unit 31 executes various inspections on the workpiece image. Since the image processing controller 3 includes the control unit 31 having an arithmetic processing capability higher than that of the smart camera 7, it is possible to execute an inspection having a load larger than that of the smart camera 7 in a short time.

The storage unit 32 is a portion where the program executed by the control unit 31, the workpiece images generated by the normal cameras 5A and 5B and the smart camera 7, various pieces of setting information, inspection results, and the like are stored.

The interface unit 33 is a portion to which the normal cameras 5A and 5B, the smart camera 7, the external illuminators 8A, 8B, and 8C, the illumination controllers 9A and 9B, the PLC 4, the inspection setting apparatus 2, and the like are connected. Communication with the devices can be performed via the interface unit 33.

The inspection setting apparatus 2 includes a control unit 20, a storage unit 21, and a reception unit 23 in addition to the display unit 2a and the operation unit 2b. The control unit 20 is implemented by, for example, a microcomputer, and can execute various processes when a predetermined program is executed. The storage unit 21 is implemented by, for example, a semi-conductor memory, and is a portion where the program executed by the control unit 20, various pieces of setting information, and the like are stored.

Figure 5:
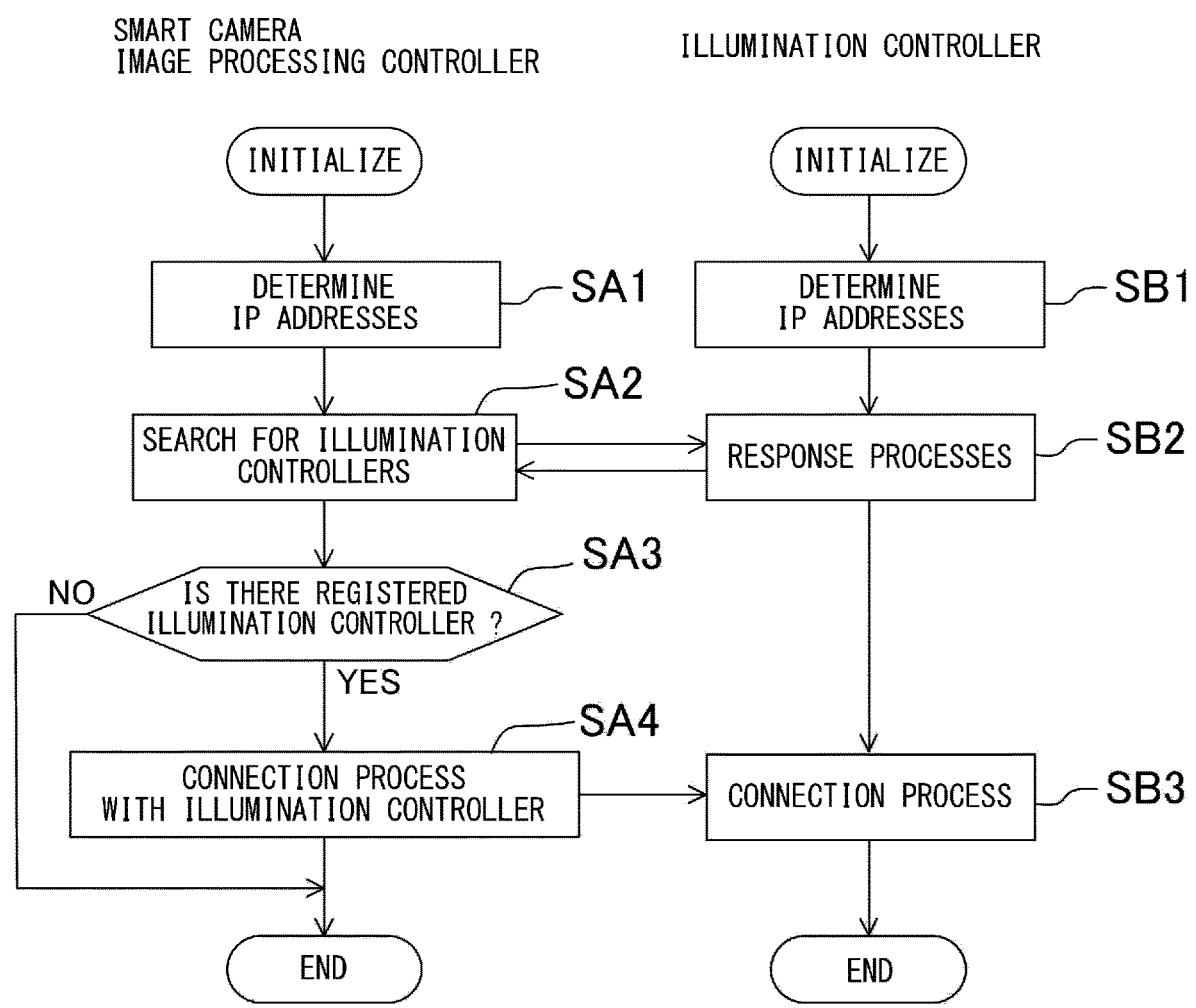
FIG. 5 is a flowchart showing an example of a procedure of an initialization process.

Hereinafter, processes will be specifically described. FIG. 5 shows a procedure of an initialization process, and shows a process started when the smart camera 7, the image processing controller 3, and the illumination controllers 9A and 9B are activated. The smart camera 7 and the image processing controller 3 determine IP addresses in step SAL. Further, the illumination controllers 9A and 9B determine IP addresses in step SB1. A well-known method from the related art can be used for a procedure of determining the IP addresses. For example, when all devices on the same network search for a dynamic host configuration protocol (DHCP) server and the DHCP server is present, IP addresses are given therefrom, and when no DHCP server is present, the devices temporarily determine IP addresses on a local network by themselves with a random number, perform adjustment such that there is no duplication in the temporarily determined IP addresses of the devices, and finally determine the IP addresses.

Thereafter, the smart camera 7 and the image processing controller 3 search for the illumination controllers 9A and 9B on the network in step SA2. The illumination controllers 9A and 9B execute response processes in step SB2 for the search in step SA2. The smart camera 7 and the image processing controller 3 receive results of the response processes by the illumination controllers 9A and 9B, and determine whether the illumination controllers 9A and 9B are registered illumination controllers in step SA3. That is, an illumination controller can be registered in advance in the smart camera 7 and the image processing controller 3. For example, the user registers a type and identification information of the illumination controller in advance. In step SA3, the type and the identification information of the illumination controller transmitted based on the results of the response processes are acquired, and the information is compared with the information registered in advance, and when there is a match, it is determined that the illumination controller is registered, and when there is no match, it is determined that the illumination controller is not registered.

When it is determined as YES in step SA3, a connection process with the illumination controller is executed in step SA4, and the illumination controller is connected to the smart camera 7 and the image processing controller 3 in step SB3. On the other hand, when it is determined as NO in step SA3, the flow is ended without executing the connection process.

Figure 6:
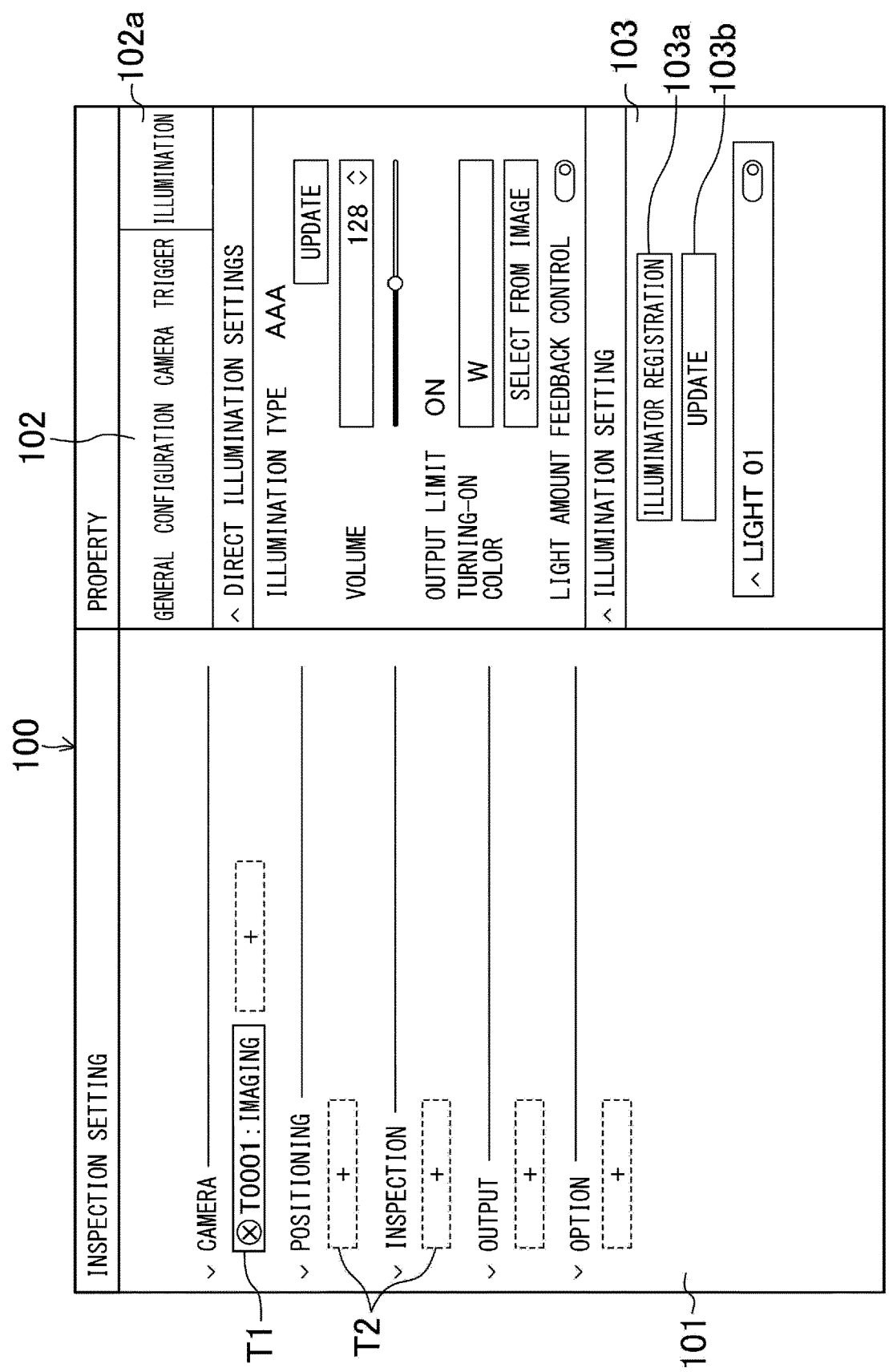
FIG. 6 is an example of a screen displayed during an inspection setting.

During inspection settings, the control unit 20 of the inspection setting apparatus 2 generates a setting screen 100 as shown in FIG. 6, and causes the display unit 2a to display the setting screen 100. The setting screen 100 is provided with an inspection setting region 101 for creating the inspection settings including the imaging tool T1 and the inspection tool T2, and a property setting region 102. In the inspection setting region 101, various settings related to imaging and various settings related to the inspection can be performed, for example, in a pallet format. The property setting region 102 is provided with an illumination setting button 102a operated during an illumination setting. When the illumination setting button 102a is operated, the reception unit 23 of the inspection setting apparatus 2 receives the operation. Then, the control unit 20 generates an illumination setting property screen 103, and causes the display unit 2a to display the illumination setting property screen 103.

Figure 7:
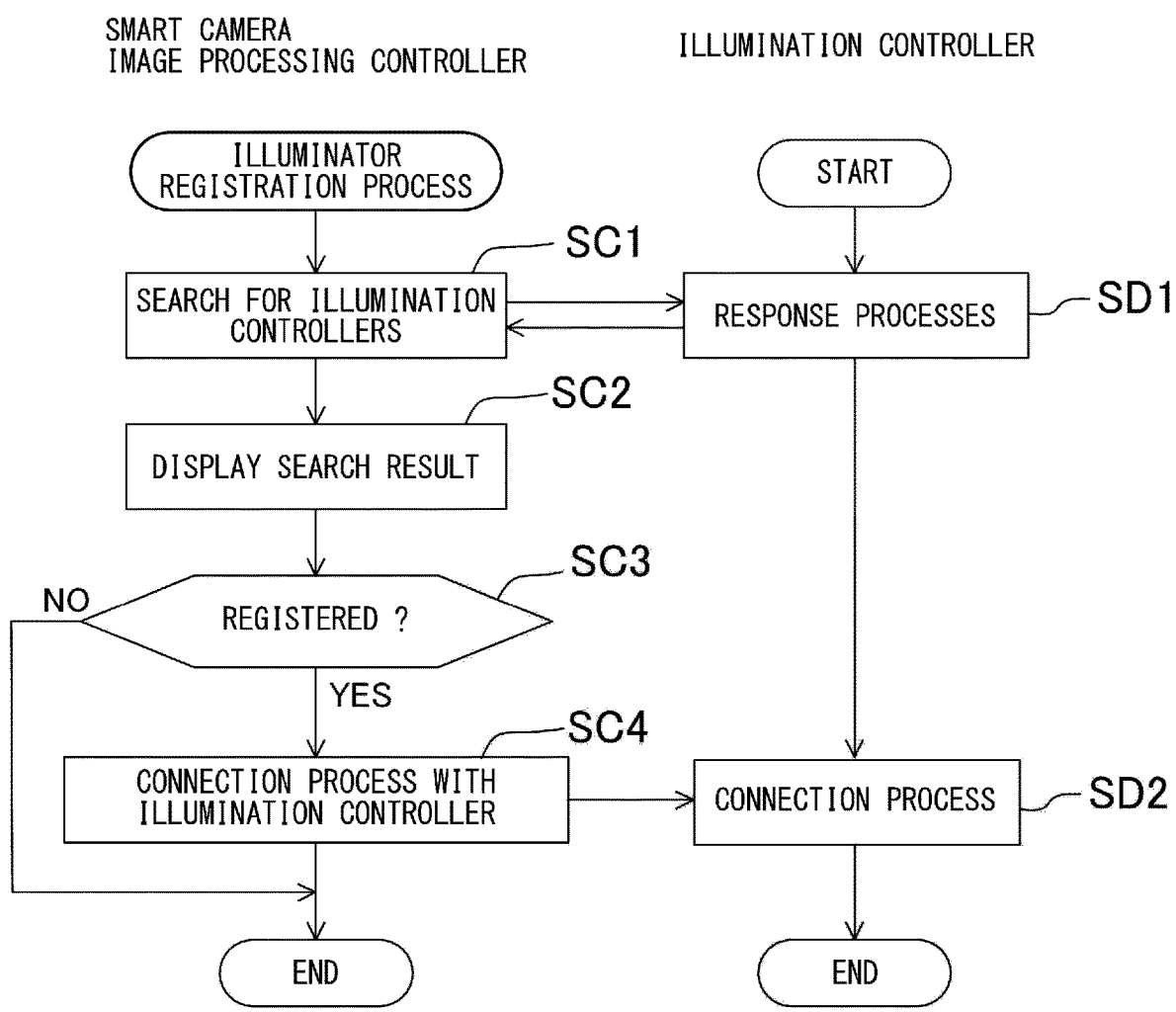
FIG. 7 is a flowchart showing an example of a procedure of an illuminator registration process.

The illumination setting property screen 103 is provided with an illuminator registration button 103a. When the illuminator registration button 103a is operated, the reception unit 23 of the inspection setting apparatus 2 receives the operation, and a flow shown in FIG. 7 is executed. In step SC1, the smart camera 7 and the image processing controller 3 search for the illumination controllers. The illumination controllers execute response processes in step SD1 for the search in step SC1.

Figure 8:
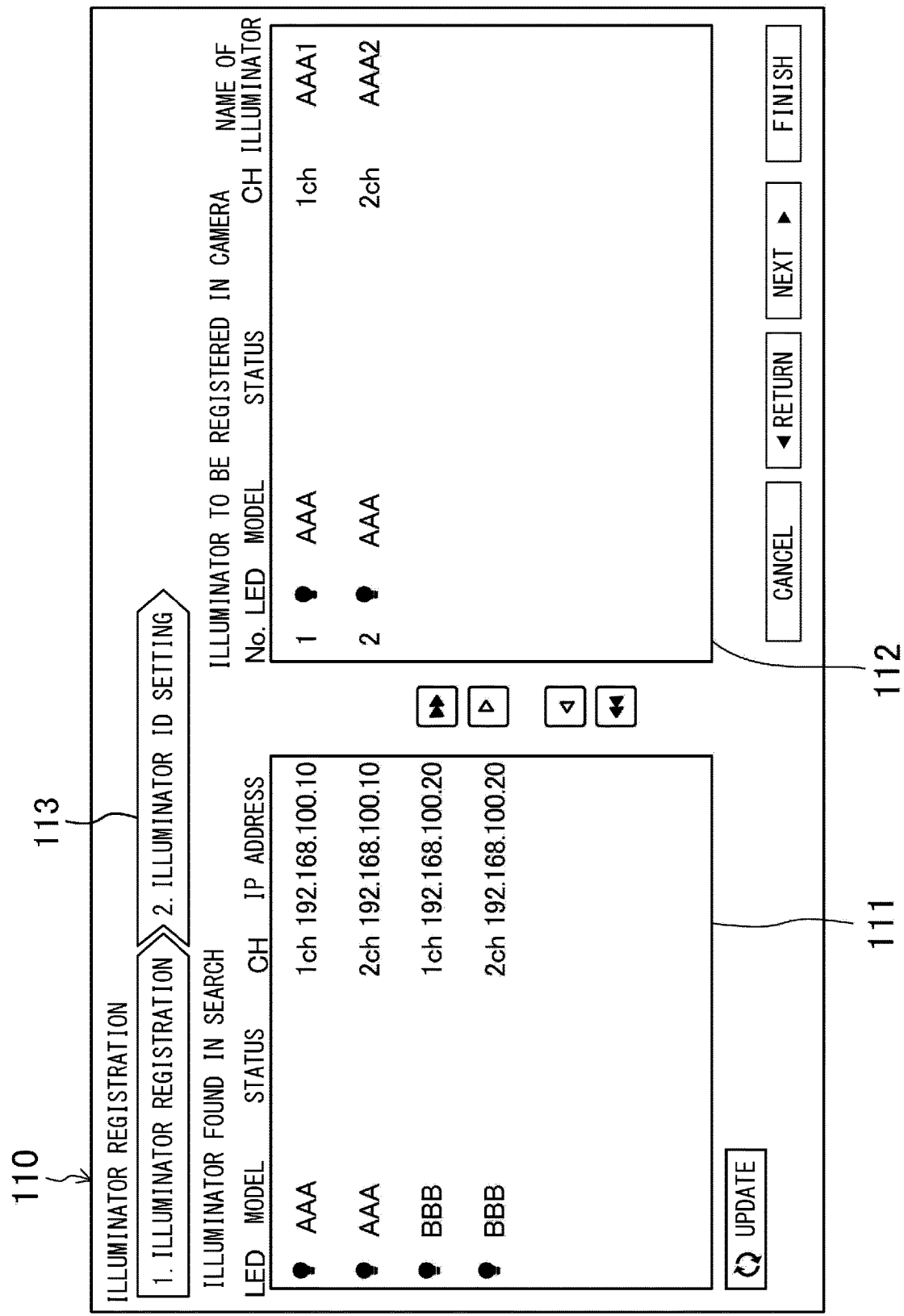
FIG. 8 is an example of a display screen of an illuminator search result.

The smart camera 7 and the image processing controller 3 cause the inspection setting apparatus 2 to display search results in step SC2. Specifically, the control unit 20 of the inspection setting apparatus 2 generates a search result display screen 110 as shown in FIG. 8, and causes the display unit 2a to display the search result display screen 110. The search result display screen 110 is provided with a result display region 111 where the illumination controllers and illuminators found in the search are displayed, and a registration display region 112 where the illumination controllers and the illuminators to be registered are displayed. All the illumination controllers and the illuminators found by searching on the network are displayed in the result display region 111. That is, the inspection setting apparatus 2 can cause the display unit 2a to display a list of a plurality of external illuminators on the network. The reception unit 23 can receive, from the user, a selection of an external illuminator to be used when executing the imaging tool T1 (shown in FIG. 6) from the list of external illuminators.

As shown in FIG. 4, since one illumination controller is provided with the first illumination output port 93e and the second illumination output port 93f, at least two external illuminators can be connected, and are displayed as "1 ch" and "2 ch" in the result display region 111. An IP address serves as a unit of the illumination controller. Further, the user can also give any name to the found illumination controller. When giving the name, the user may operate the operation unit 2b. Information on an input name is stored in the storage unit 21 or the like in a state of being associated with an illumination controller.

The search result display screen 110 is provided with an illuminator ID setting button 113. When the illuminator ID setting button 113 is operated, the control unit 20 of the inspection setting apparatus 2 generates an illuminator ID setting screen 114 as shown in FIG. 9, and causes the display unit 2a to display the illuminator ID setting screen 114. The illuminator ID setting screen 114 is provided with an illuminator ID setting region 114a. The illuminator ID can be used when setting, for example, a pair of a camera and an illuminator, and is formed of a combination of, for example, characters and symbols. The inspection setting apparatus 2 specifies an external illuminator to be used when executing, for example, the imaging tool T1 according to an illuminator ID. The inspection setting apparatus 2 can create inspection settings specified according to an illuminator ID, output the inspection settings, and use the inspection settings during an operation.

For example, when executing the imaging tool T1 corresponding to the first normal camera 5A in a case of inspection settings in which the first external illuminator 8A is used, the reception unit 23 of the inspection setting apparatus 2 can receive a selection of the first external illuminator 8A by the user from the list of the external illuminators as shown in FIG. 8. Accordingly, the inspection setting apparatus 2 creates inspection settings in which the first normal camera 5A and the first external illuminator 8A are associated with each other. In this case, during an operation, when executing the imaging tool T1 corresponding to the first normal camera 5A, the image processing controller 3 issues an instruction to the illumination controller 9A so as to turn on the first external illuminator 8A.

When an illuminator ID is set, settings using an IP address may not be performed, and the specification work becomes easy. Particularly, when a plurality of illumination controllers are connected in a non-daisy chain, it is necessary to set illuminator IDs. On the other hand, in a case of a daisy chain, it is possible to give sequential numbers because an order in which the illumination controllers are connected can be specified.

Here, for example, an apparatus having the same configuration may be created for an apparatus including a camera and an illuminator. In such a case, because the apparatuses are the same, settings for the camera and the illuminator are basically the same. Therefore, when a setting file in which setting information indicating which camera uses/does not use which illuminator is defined is simply copied, even another apparatus having the same configuration can also be operated in a similar manner.

However, when there is no concept of the illuminator ID, the illumination controllers are managed in units of IP addresses in the "setting file", and no operation is performed with simple copy. This is because IP addresses of illumination controllers of a new apparatus are different from IP addresses of illumination controllers of an apparatus of an expansion original.

Therefore, as in the present embodiment, when an illuminator ID is set in advance for a pair of a camera and an illuminator, the illuminator can be managed in units of an ID in the "setting file". In addition, when an illuminator ID in the setting file and an IP address of an illumination controller on a new apparatus side are correlated in advance to each other by an illuminator registration process of the new apparatus, even another apparatus having the same configuration can also implement an expected operation.

In step SC3 shown in FIG. 7, it is determined whether the illumination controller displayed in step SC2 is registered. When the user performs a registration operation, YES is determined in step SC3. When it is determined as YES in step SC3, a connection process with the illumination controller is executed in step SC4, and the illumination controller is connected to the smart camera 7 and the image processing controller 3 in step SD2. On the other hand, when it is determined as NO in step SC3, the flow is ended without executing the connection process.

Figure 10:
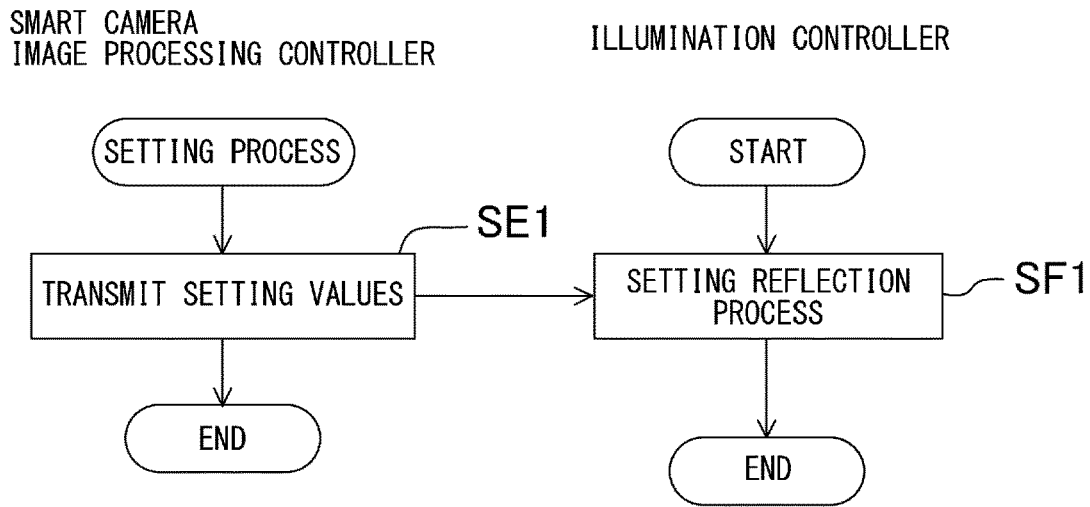
FIG. 10 is a flowchart showing an example of a procedure of a setting process.
Figure 11:
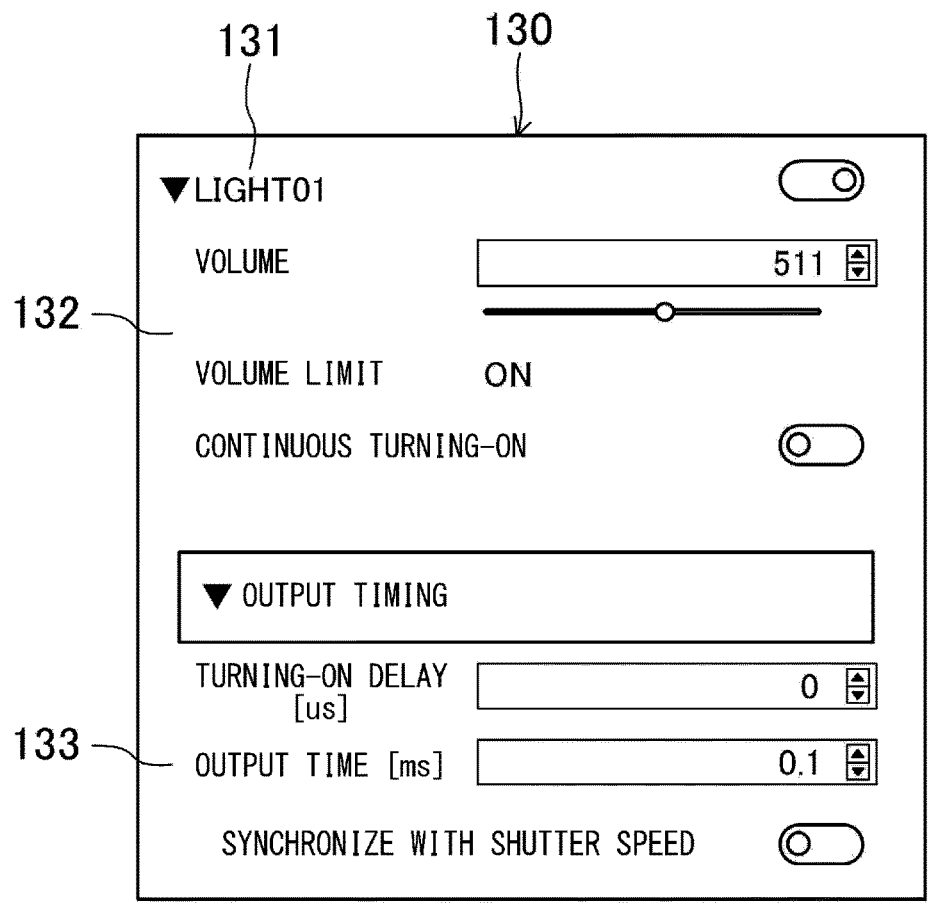
FIG. 11 is an example of an update screen.

FIG. 10 is a flowchart showing a procedure of a setting process. The setting screen 100 shown in FIG. 6 is provided with an update button 103b. When the update button 103b is operated, the reception unit 23 of the inspection setting apparatus 2 receives the operation. Then, the control unit 20 generates an update screen 130 shown in FIG. 11, and causes the display unit 2a to display the update screen 130. The update screen 130 is provided with an illuminator ID display region 131, an illumination volume setting region 132, and an output timing setting region 133. An illuminator ID of a selected illumination controller is displayed in the illuminator ID display region 131. In the illumination volume setting region 132, it is possible to set an illumination volume by using a numerical value or the like, to switch on/off a volume limit, and to set continuous turning-on of an illuminator. In the output timing setting region 133, it is possible to set a turning-on delay, an output time, and the like by using a numerical value, and to set whether to synchronize with a shutter speed.

In step SE1 in the flowchart in FIG. 10, the smart camera 7 and the image processing controller 3 transmit setting values to an illumination controller. The setting values are values set on the update screen 130 shown in FIG. 11. In step SF1, the setting values transmitted in step SE1 are reflected by the illumination controller.

Figure 12:
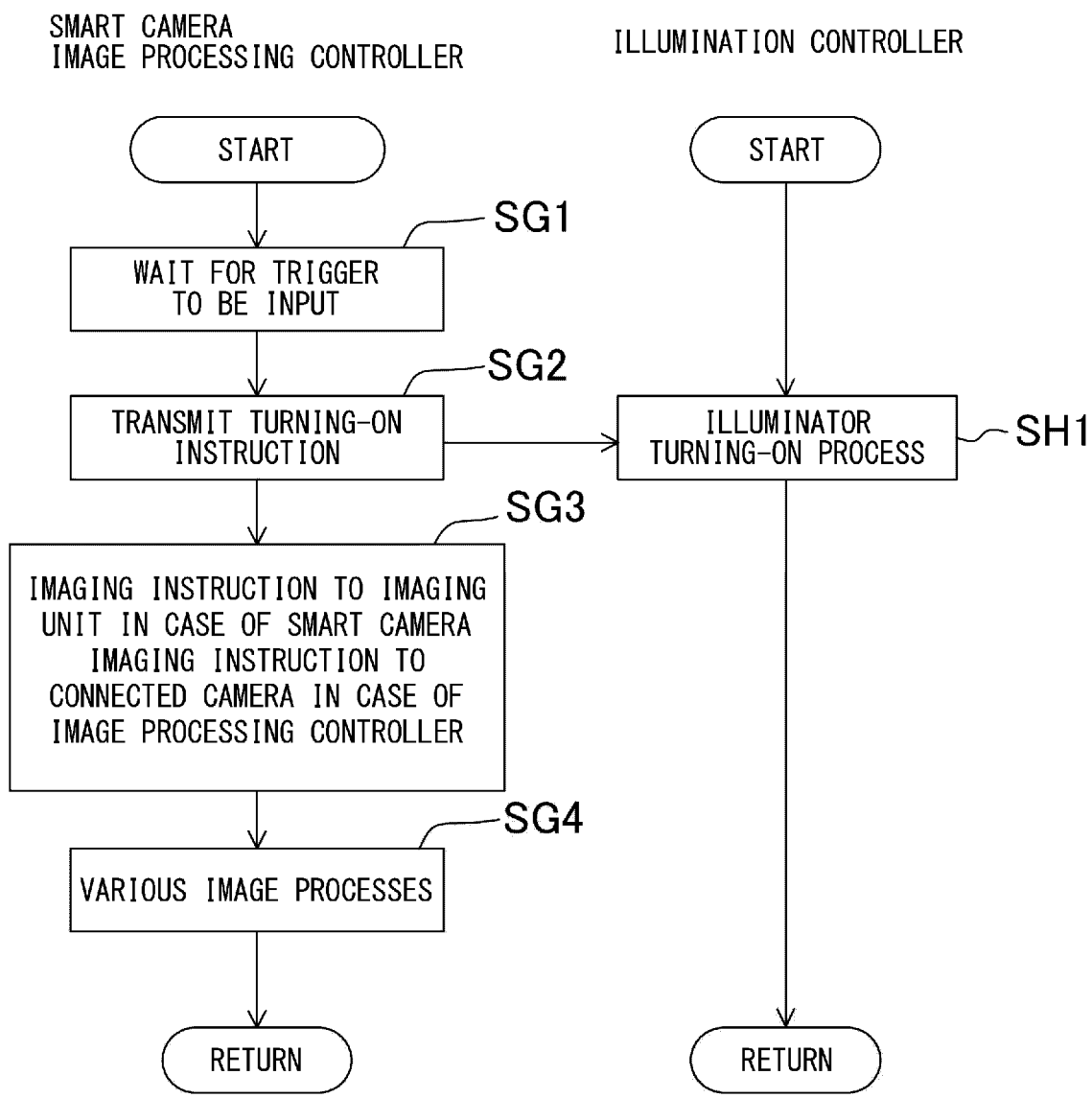
FIG. 12 is a flowchart showing an example of a procedure of a process during an operation.

FIG. 12 shows a processing procedure during an operation of the image inspection systems 1A and 1B. Operation start is instructed by the user. In Step SG1, a trigger to be input from the PLC 4 or the like is waited for. When the trigger is received, the process proceeds to step SG2, and the smart camera 7 and the image processing controller 3 transmit a turning-on instruction to the illumination controller. When receiving the turning-on instruction in step SH1, the illumination controller turns on an external illuminator. That is, the smart camera 7 and the image processing controller 3 instruct the illumination controller to turn on the external illuminator selected during a setting when executing the imaging tool T1 created by the inspection setting apparatus 2.

In step SG3, when the smart camera 7 is connected, an imaging instruction is transmitted to the imaging unit 70 of the smart camera 7. Accordingly, the imaging unit 70 of the smart camera 7 executes imaging to generate a workpiece image. On the other hand, when the smart camera 7 is not connected, that is, when the normal cameras 5A and 5B are connected, the image processing controller 3 transmits the imaging instruction to the connected normal cameras 5A and 5B. Accordingly, the normal cameras 5A and 5B execute imaging to generate workpiece images.

In step SG4, in a case of the smart camera 7, the inspection unit 71a of the smart camera 7 executes various image processes. On the other hand, in a case of the image processing controller 3, the image processing controller 3 executes various image processes on the workpiece images transmitted from the normal cameras 5A and 5B. When the smart camera 7 is connected, a part or all of the inspection process on the workpiece image generated by the smart camera 7 may be executed by the image processing controller 3.

Effects of Embodiment

As described above, according to the present embodiment, as shown in FIG. 2, in a case where the external illuminator 8A is connected to the smart camera 7 via the interface unit 72, and when the smart camera 7 is switched to the master mode, the smart camera 7 controls the external illuminator 8A by the illumination control unit 71b of the smart camera 7, and causes light to be emitted to the workpiece. The inspection process on the workpiece image generated in the master mode is executed by the inspection unit 71a of the smart camera 7. For example, an inspection result of the inspection unit 71a can be output to the inspection setting apparatus 2, and displayed by the display unit 2a. Further, the inspection result of the inspection unit 71a is also output to the PLC 4 or the like.

On the other hand, as shown in FIG. 1, in a case where the image processing controller 3 is connected to the smart camera 7 via the interface unit 72, when the smart camera 7 is switched to the slave mode, the image processing controller 3 controls the external illuminator 8A and the like, and causes light to be emitted to the workpiece. Accordingly, it is possible to prevent the illumination control of the smart camera 7 and the illumination control of the image processing controller 3 from competing with each other in a use mode in which the smart camera 7 having the illumination control function is connected to the image processing controller 3.

The workpiece image generated in the slave mode is transferred to the image processing controller 3, and the inspection process is executed by the image processing controller 3.

The above-described embodiment is merely an example in all respects, and should not be construed in a limited manner. Further, modifications and changes belonging to an equivalent scope of the claims are all within the scope of the present invention.

INDUSTRIAL APPLICABILITY

As described above, the smart camera and the image inspection systems according to the present disclosure can be used for, for example, inspecting various workpiece images.

What is claimed is:

1. A smart camera having an illumination control function, the smart camera comprising:
an imaging unit configured to image a workpiece to generate a workpiece image;
an inspection unit configured to execute an inspection process on the workpiece image;
an interface unit connectable to an external illuminator and an image processing controller configured to execute the inspection process on the workpiece image; and
a mode switching unit configured to switch a mode to any one of a master mode in which the illumination control function is executable and a slave mode in which the illumination control function is not executable, wherein
in the master mode, the smart camera turns on an external illuminator connected via the interface unit by the illumination control function, images light reflected by a workpiece, among beams of light of the external illuminator, by the imaging unit to generate a workpiece image, and executes an inspection process on the workpiece image by the inspection unit, and
in the slave mode, the smart camera images light reflected by a workpiece, among beams of light of an illuminator turned on under control of the image processing controller connected via the interface unit, by the imaging unit to generate a workpiece image, and transfers the workpiece image to the image processing controller.

2. The smart camera according to claim 1, wherein the mode switching unit is configured to receive a mode switching signal from the image processing controller via the interface unit, and when receiving the mode switching signal, the mode switching unit switches the mode from the master mode to the slave mode based on the mode switching signal.

3. An image inspection system comprising:
a smart camera having an illumination control function;
an illumination controller connected to the smart camera via a network and having an IP address;
a plurality of external illuminators connected to the smart camera via the illumination controller; and
an inspection setting apparatus connected to the smart camera and configured to create an inspection setting including an imaging tool and an inspection tool, wherein
the inspection setting apparatus creates the inspection setting by displaying a list of the plurality of external illuminators on the network, and receiving from a user a selection of an external illuminator to be used when executing the imaging tool from the list,
the smart camera includes
an imaging unit configured to image a workpiece to generate a workpiece image,
an inspection unit configured to execute an inspection process on the workpiece image,
an interface unit connectable to an external illuminator and an image processing controller configured to execute the inspection process on the workpiece image, and
a mode switching unit configured to switch a mode to any one of a master mode in which the illumination control function is executable and a slave mode in which the illumination control function is not executable,
in the master mode, the smart camera turns on an external illuminator connected via the interface unit by the illumination control function, images light reflected by a workpiece, among beams of light of the external illuminator, by the imaging unit to generate a workpiece image, and executes an inspection process on the workpiece image by the inspection unit,
in the slave mode, the smart camera images light reflected by a workpiece, among beams of light of an illuminator turned on under control of the image processing controller connected via the interface unit, by the imaging unit to generate a workpiece image, and transfers the workpiece image to the image processing controller, and the smart camera instructs the illumination controller to turn on the selected external illuminator when executing the imaging tool created by the inspection setting apparatus.

4. The image inspection system according to claim 3, wherein the inspection setting apparatus is configured to give illuminator IDs to the plurality of external illuminators on the network, and is configured to create the inspection setting in which the external illuminator to be used when executing the imaging tool is specified by the illuminator ID, and to output the inspection setting.

5. An image inspection system comprising:

a smart camera having an illumination control function;

an image processing controller connected to the smart camera, and configured to execute an inspection process on a workpiece image generated by the smart camera;

an illumination controller connected to the image processing controller via a network and having an IP address;

a plurality of external illuminators connected to the image processing controller via the illumination controller; and an inspection setting apparatus connected to the image processing controller and configured to create an inspection setting including an imaging tool and an inspection tool, wherein the smart camera includes an imaging unit configured to image a workpiece to generate a workpiece image, an inspection unit configured to execute an inspection process on the workpiece image, an interface unit connectable to an external illuminator and the image processing controller, and a mode switching unit configured to switch a mode to any one of a master mode in which the illumination control function is executable and a slave mode in which the illumination control function is not executable, in the master mode, the smart camera turns on an external illuminator connected via the interface unit by the illumination control function, images light reflected by a workpiece, among beams of light of the external illuminator, by the imaging unit to generate a workpiece image, and executes an inspection process on the workpiece image by the inspection unit, in the slave mode, the smart camera images light reflected by a workpiece, among beams of light of an illuminator turned on under control of the image processing controller connected via the interface unit, by the imaging unit to generate a workpiece image, and transfers the workpiece image to the image processing controller, the inspection setting apparatus creates the inspection setting by displaying a list of the plurality of external illuminators on the network, and receiving from a user a selection of an external illuminator to be used when executing an imaging tool corresponding to the smart camera from the list, and the image processing controller instructs the illumination controller to turn on the selected external illuminator when executing the imaging tool.

6. The image inspection system according to claim 5, wherein the smart camera and the image processing controller are configured to store an inspection setting created by the inspection setting apparatus, and the smart camera and the image processing controller only refer to the inspection setting stored in the image processing controller without referring to the inspection setting stored in the smart camera.

7. The image inspection system according to claim 5, wherein the inspection setting apparatus is configured to give illuminator IDs to the plurality of external illuminators on the network, and is configured to create the inspection setting in which the external illuminator to be used when executing the imaging tool is specified by the illuminator ID, and to output the inspection setting.

8. The image inspection system according to claim 5, further comprising:

a first camera connected to the image processing controller, wherein the inspection setting apparatus creates the inspection setting by further receiving from a user a selection of a first external illuminator to be used when executing an imaging tool corresponding to the first camera from the list, and the image processing controller instructs the illumination controller to turn on the first external illuminator when executing the imaging tool corresponding to the first camera.

* * * * *